US012689083B2

(12) United States Patent
Hong et al.

(10) Patent No.: US 12,689,083 B2
(45) Date of Patent: Jul. 21, 2026

(54) BATTERY MODULE AND BATTERY PACK INCLUDING THE SAME

(71) Applicant: LG Energy Solution, Ltd., Seoul (KR)

(72) Inventors: Soon Chang Hong, Daejeon (KR); Hyoungsuk Lee, Daejeon (KR); Bora Jeon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 636 days.

(21) Appl. No.: 18/025,930

(22) PCT Filed: Apr. 12, 2022

(86) PCT No.: PCT/KR2022/005294
§ 371 (c)(1),
(2) Date: Mar. 13, 2023

(87) PCT Pub. No.: WO2022/220550
PCT Pub. Date: Oct. 20, 2022

(65) Prior Publication Data
US 2023/0352784 A1　Nov. 2, 2023

(30) Foreign Application Priority Data
Apr. 13, 2021　(KR) ........................ 10-2021-0047921

(51) Int. Cl.
　*H01M 50/262*　(2021.01)
　*H01M 50/211*　(2021.01)
　*H01M 50/242*　(2021.01)
(52) U.S. Cl.
　CPC ....... *H01M 50/211* (2021.01); *H01M 50/242* (2021.01); *H01M 50/262* (2021.01); *H01M 2220/20* (2013.01)

(58) Field of Classification Search
　CPC ............. H01M 50/202; H01M 50/204; H01M 50/207; H01M 50/209; H01M 50/211;
(Continued)

(56) References Cited

U.S. PATENT DOCUMENTS

2009/0111010 A1　4/2009　Okada et al.
2009/0325043 A1*　12/2009　Yoon ................... H01M 50/516
429/153
(Continued)

FOREIGN PATENT DOCUMENTS

JP　　2011171176 A　　9/2011
JP　　　5121395 B2　　1/2013
(Continued)

OTHER PUBLICATIONS

Machine translation: KR-20210129773-A, Yoon Sang Il, (Year: 2025).*
(Continued)

*Primary Examiner* — Kendra Ly
(74) *Attorney, Agent, or Firm* — Lerner David LLP

(57) ABSTRACT

A battery module according to an embodiment of the present disclosure includes: a cell assembly including a battery cell stack in which a plurality of battery cells are stacked; a module frame that wraps the cell assembly; and end plates that cover the front and rear surfaces of the cell assembly opened in the module frame. The module frame comprises a frame member which covers a lower part and both side surfaces of the cell assembly, and an upper plate that covers an upper part of the cell assembly. A first fixing part is formed at an edge of the frame member coupled with the end plate.

16 Claims, 6 Drawing Sheets

(58) Field of Classification Search
CPC ............. H01M 50/213; H01M 50/262; H01M 50/264; H01M 50/271
See application file for complete search history.

(56) References Cited

U.S. PATENT DOCUMENTS

| | | | |
|---|---|---|---|
| 2011/0097614 A1 | 4/2011 | Kim | |
| 2012/0045686 A1 | 2/2012 | Jung | |
| 2015/0064541 A1* | 3/2015 | Noh ..................... | H01M 50/209 |
| | | | 429/156 |
| 2018/0151857 A1 | 5/2018 | Gang et al. | |
| 2019/0115573 A1 | 4/2019 | Sakurai | |
| 2019/0131596 A1* | 5/2019 | Yang ................... | H01M 50/224 |
| 2020/0243816 A1* | 7/2020 | Terauchi ............. | H01M 50/224 |

FOREIGN PATENT DOCUMENTS

| | | | | | |
|---|---|---|---|---|---|
| JP | 5159112 | B2 | 3/2013 | | |
| JP | 6650428 | B2 | 2/2020 | | |
| JP | WO2019031169 | A1 | 6/2020 | | |
| KR | 101127602 | B1 | 3/2012 | | |
| KR | 101173870 | B1 | 8/2012 | | |
| KR | 101806635 | B1 | 12/2017 | | |
| KR | 102002128 | B1 | 10/2019 | | |
| KR | 20190138072 | A | 12/2019 | | |
| KR | 20200008624 | A | 1/2020 | | |
| KR | 20210129773 | A | * | 10/2021 | ............ H01M 50/24 |

OTHER PUBLICATIONS

International Search Report for PCT/KR2022/005294 mailed Aug. 5, 2022. 3 pgs.

* cited by examiner

【FIG. 1】
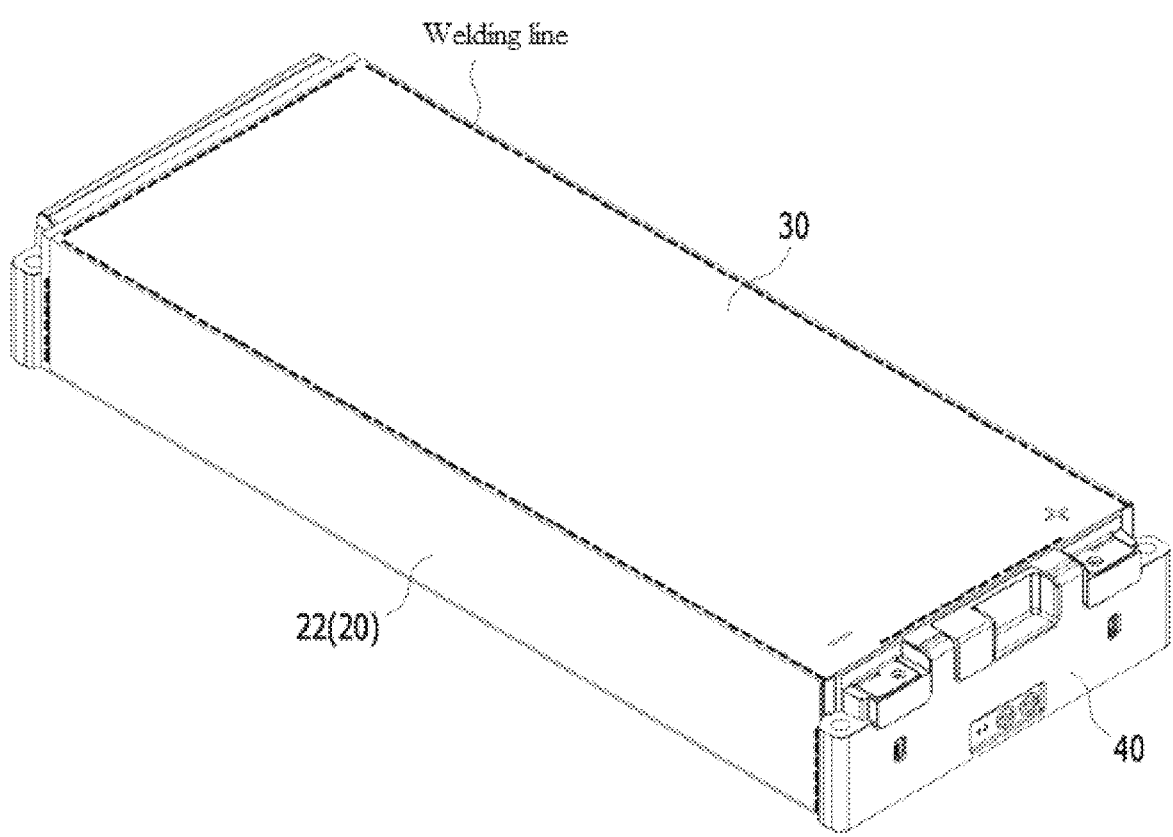
Prior Art

【FIG. 2】
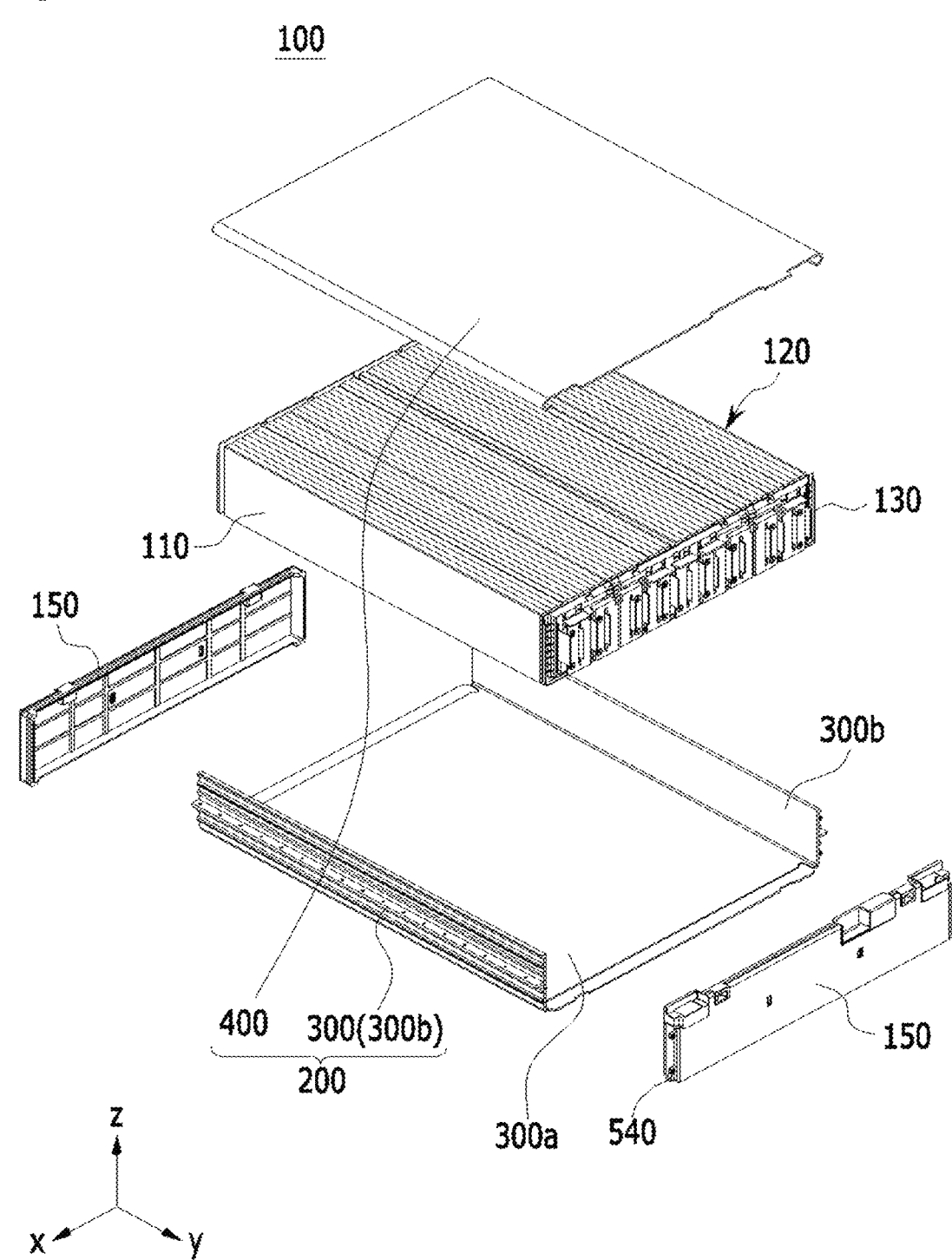

【FIG. 3】
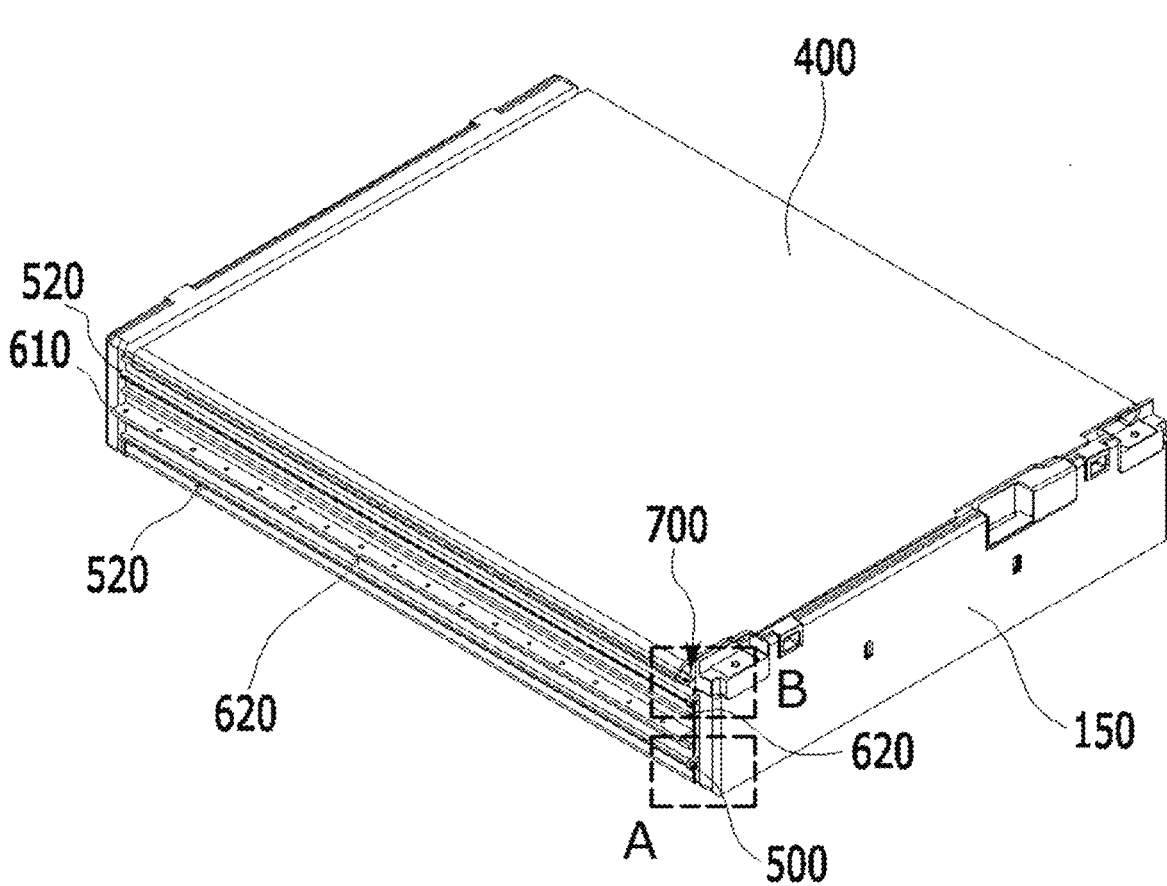

【FIG. 4】
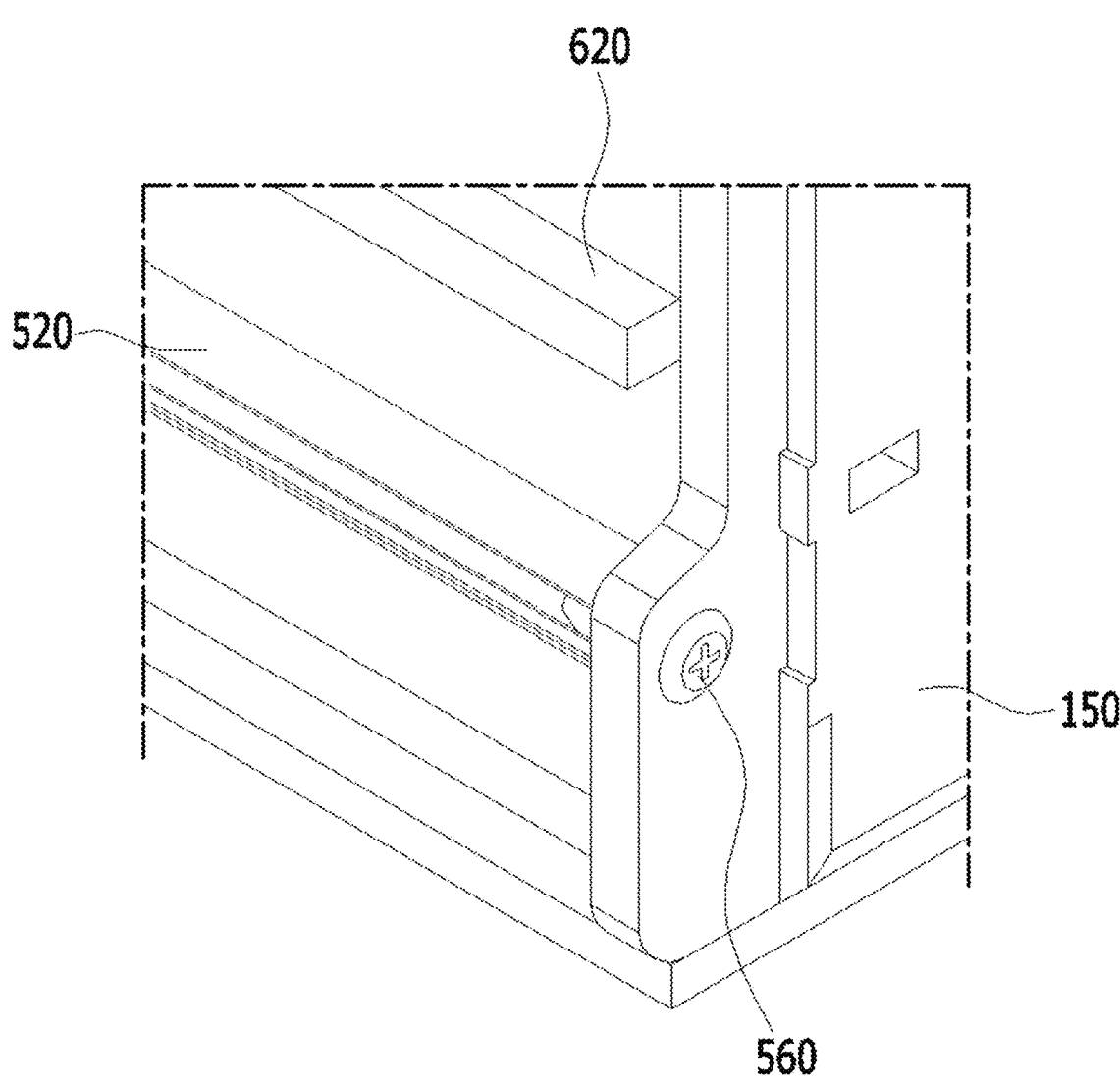

【FIG. 5】
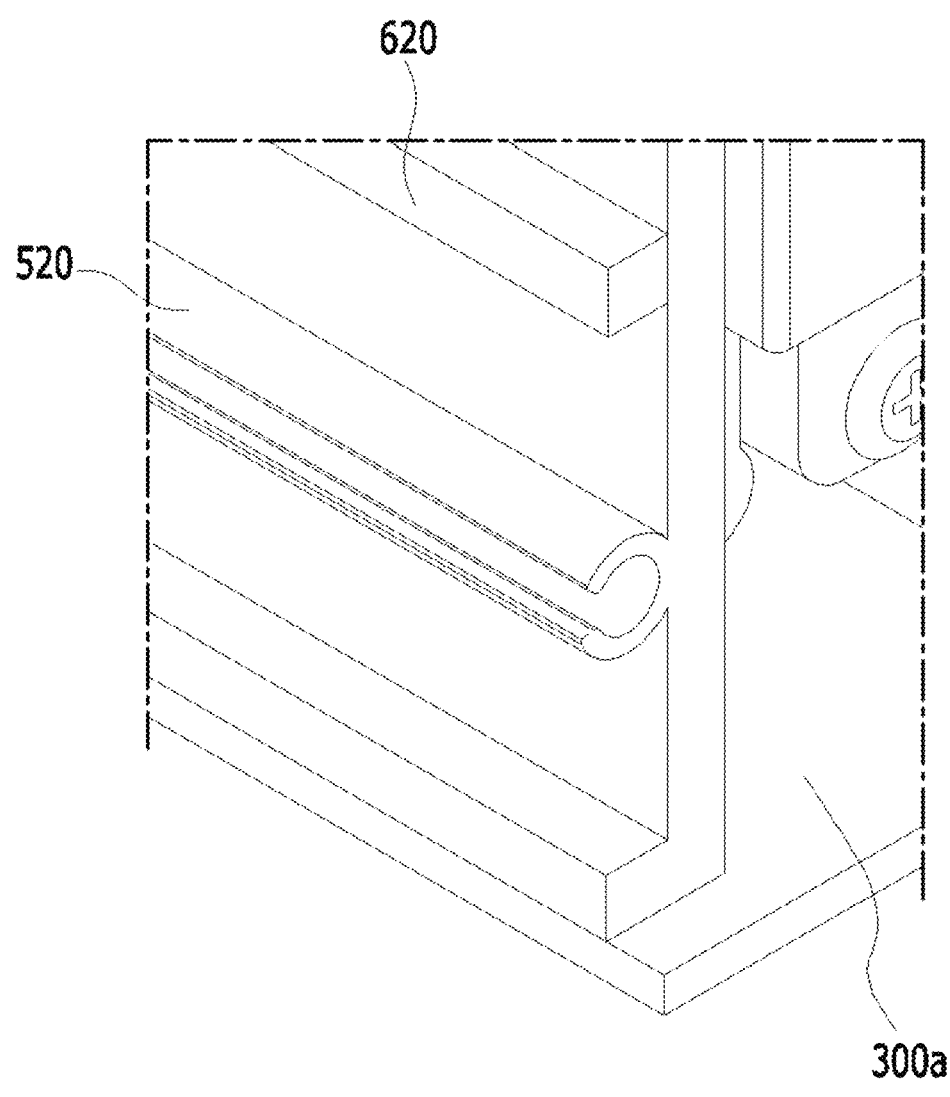

【FIG. 6】
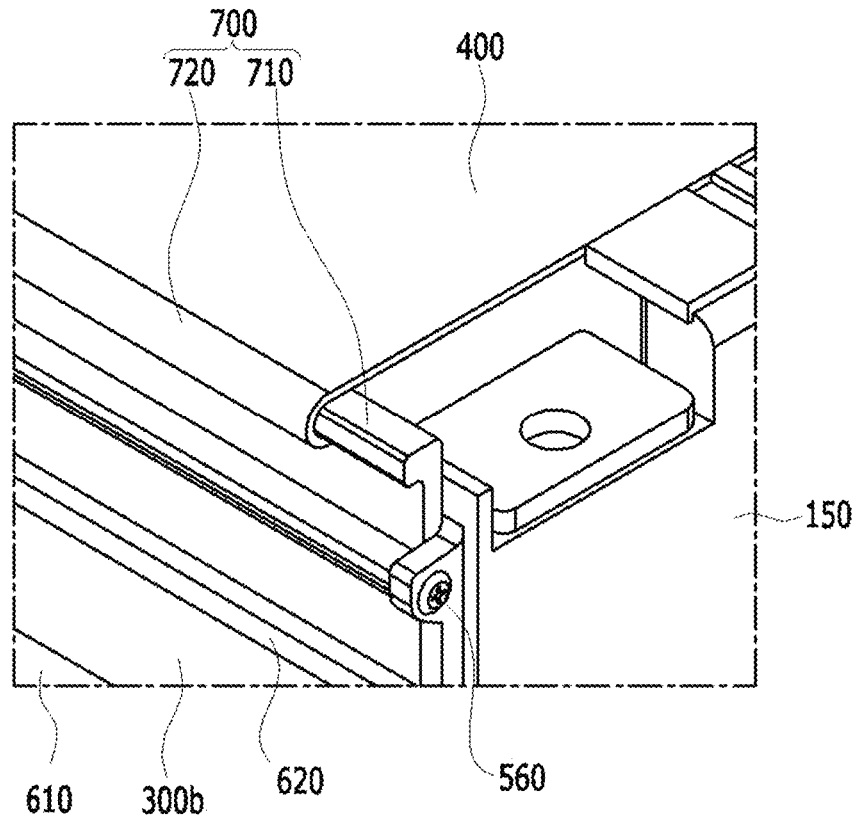
【FIG. 7】
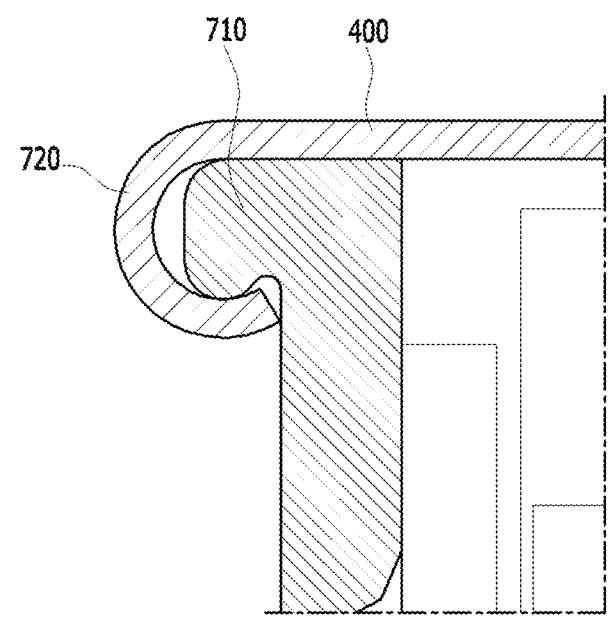

BATTERY MODULE AND BATTERY PACK INCLUDING THE SAME

CROSS CITATION WITH RELATED APPLICATION(S)

The present application is a national phase entry under 35 U.S.C § 371 of International Application No. PCT/KR2022/005294 filed Apr. 12, 2022, which claims priority from Korean Patent Application No. 10-2021-0047921 filed on Apr. 13, 2021, all of which are incorporated herein by reference.

TECHNICAL FIELD

The present disclosure relates to a battery module and a battery pack including the same, and more particularly, to a battery module having improved assemblability and structural stability and a battery pack including the same.

BACKGROUND

Along with the technology development and increased demand for mobile devices, demand for secondary batteries as energy sources has been increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series or in parallel.

Meanwhile, when a plurality of battery cells are connected in series or in parallel to configure a battery pack, it is common to configure a battery module composed of at least one battery cell first, and then configure a battery pack by using at least one battery module and adding other components.

Such a battery module includes a battery cell stack in which a plurality of battery cells are stacked, and a module frame that houses the battery cell stack.

FIG. 1 is a perspective view of a conventional battery module.

Referring to FIG. 1, the conventional battery module 10 may be formed with a U-shaped module frame 20 for housing a battery cell stack in which a plurality of battery cells are stacked, an upper plate 30 that covers the upper side surface of the battery cell stack and end plates 40 that cover the front and rear surfaces of the battery cell stack. The U-shaped module frame 20 may be formed of a bottom part and both side parts 22.

At this time, welding is performed for assembling the battery module frame, wherein as shown in FIG. 1, welding between the end plate 40 and the U-shaped module frame 20, and between the end plate 40 and the upper plate 30 is preformed and at the same time, welding between the upper end of both side parts 22 of the U-shaped module frame 20 and both side edges of the upper plate 30 can be performed.

Due to many welding lines between the frame structures in this way, the difficulty of welding processability is increased. Especially in the case of welding between the U-shaped module frame and the end plate, and between the U-shaped module frame and the upper plate, the probability of occurrence of defects is high, which causes a problem that the assemblability of the battery module is deteriorated. Further, the materials to be welded must be the same as each other in view of welding characteristics, which causes a problem that it is difficult to secure the diversity of materials. In addition, there is no structure that can prevent deformation of the side surface part of the U-shaped module frame when cell swelling occurs, which causes a problem that the structural stability is lowered. Therefore, in addition to improving the assemblability of the battery module, there is a need to develop a structure capable of improving the possibility of introducing a material that can secure the rigidity of the battery module and of improving the structural stability of the battery module.

DETAILED DESCRIPTION OF THE INVENTION

Technical Problem

It is an object of the present disclosure to provide a battery module having improved assemblability and structural stability and a battery pack including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a battery module comprising: a cell assembly including a battery cell stack in which a plurality of battery cells are stacked; a module frame that wraps the cell assembly; and end plates that cover the front and rear surfaces of the cell assembly opened in the module frame, wherein the module frame comprises a frame member that covers a lower part and both side surfaces of the cell assembly, and an upper plate that covers an upper part of the cell assembly, and wherein a first fixing part is formed at an edge of the frame member coupled with the end plate.

The fixing part includes a screw coupling part, and a hole part formed in the end plate, and may include a screw member fitted in the hole part.

The screw coupling part may be formed at an edge of the frame member, and the screw member may be fixed by the screw coupling part.

The frame member may include a side surface part that covers a side surface of the cell assembly, and a bottom part that supports the lower part of the cell assembly, and the screw coupling part may be formed on the side surface part so as to be parallel to the edge of the side surface part where the side surface part and the bottom part are in contact with each other.

The screw coupling part may have a fan-shaped arc shape.

The screw coupling part may be formed integrally with the side surface part.

The side surface part may be formed with a first protrusion part and a second protrusion part.

The second protrusion parts may be formed in plural numbers, and the first protrusion part may be formed between the plurality of the second protrusion parts.

The first protrusion part may be formed so as to protrude more outward from the side surface part than the second protrusion part A protrusion-shaped second fixing part may be formed at an edge of the frame member coupled with the upper plate.

The second fixing part may include a third protrusion part formed at an edge of the frame member, and a curved surface part extending from an edge of the upper plate.

The curved surface part may be fastened and fixed to the third protrusion part.

The curved surface part may be formed in a circular arc shape.

The curved surface part may be formed in a semicircular arc shape

The curved surface part may be formed on the whole of one edge of the upper plate, and the third protrusion part may be formed on the whole of one edge of the frame member.

The curved surface part may be formed integrally with the upper plate.

According to another embodiment of the present disclosure, there is provided a battery pack comprising the above-mentioned battery module.

Advantageous Effects

The battery module according to an embodiment of the present disclosure forms a fixing part between the frame member and the end plate, and between the frame member and the upper plate, thereby providing the effect of improving assemblability.

Additionally, the battery module according to an embodiment of the present disclosure includes a screw coupling part and a protrusion part formed on the frame member, thereby capable of minimizing deformation when cell swelling occurs.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view of a conventional battery module;

FIG. 2 is an exploded perspective view of a battery module according to an embodiment of the present disclosure;

FIG. 3 is a diagram showing a state in which the battery module of FIG. 2 is assembled;

FIG. 4 is an enlarged view of a section A of FIG. 3, which is a diagram showing a state in which the first fixing part of the battery module according to an embodiment of the present disclosure is fastened;

FIG. 5 is a diagram showing a state in which the first fixing part of FIG. 4 is not fastened;

FIG. 6 is an enlarged view of a section B of FIG. 3, which is a diagram showing the second fixing part of the battery module according to an embodiment of the present disclosure; and FIG. 7 is a diagram showing a cross-section of the second fixing part of FIG. 6.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

The terms "first," "second," etc. may be used to explain various components, but the components should not be limited by the terms. These terms are only used to distinguish one component from the other component.

Now, a battery module including a first fixing part and a second fixing part according to an embodiment of the present disclosure will be described with reference to FIGS. 2 to 5.

FIG. 2 is an exploded perspective view of a battery module according to an embodiment of the present disclosure. FIG. 3 is a diagram showing a state in which the battery module of FIG. 2 is assembled.

Referring to FIGS. 2 and 3, a battery module 100 according to the present embodiment includes a cell assembly 120 including a battery cell stack 120 in which a plurality of battery cells 110 are stacked, a module frame 200 that wraps the cell assembly 120, and end plates 150 that cover the front and rear surfaces of the cell assembly 120 opened in the module frame 200. Further, the battery module 100 further includes a busbar frame 130 located between the end plate 150 and the battery cell stack 120.

The battery cell 110 is a secondary battery and can be configured into a pouch-type secondary battery. The battery cells 110 can be configured in plural numbers, and the plurality of battery cells 110 can be stacked so as to be electrically connected to each other, thereby forming a battery cell stack 120 and forming a cell assembly 120 including a battery cell stack 120. The plurality of battery cells 110 may include an electrode assembly, a cell case, and an electrode lead protruding from the electrode assembly, respectively.

The module frame 200 includes a frame member 300 which is opened in the upper surface, the front surface and the rear surface thereof and covers the lower part and both side surfaces of the cell assembly 120, and an upper plate 400 that covers an upper part of the cell assembly 120. However, the module frame 200 is not limited thereto, and can be replaced with a frame having another shape such as an L-shaped frame or a mono-frame surrounding the cell assembly 120 except the front and rear surfaces. The cell assembly 120 housed inside the module frame 200 can be physically protected through the module frame 200. At this time, the frame member 300 may include a bottom part 300a that supports the lower part of the cell assembly 120, and side surface parts 300b each extending upward from both ends of the frame bottom part 300a. Further, the side surface part 300b can cover the side surface of the cell assembly.

The upper plate 400 may cover the opened upper side surface of the module frame 200. The end plate 150 can cover the front and rear surfaces of the cell assembly 120. A busbar frame 130 can be formed between the end plate 150 and the front and rear surfaces of the cell assembly 120. A plurality of busbars mounted on the busbar frame 130 can protrude from the battery cells to be in contact with the electrode leads mounted on the busbar frame 130.

Conventional battery modules are coupled through welding between the both side surface upper end of the module frame and the upper plate and between the module frame and the end plate. There is a problem that a plurality of welding lines are formed between the structures, which causes a problem that the possibility of welding defects increases. In addition, welding defects can act as a cause of deterioration of the assemblability of the battery module, and thus a structure for solving the above problems is required.

Thus, according to the present embodiment, in order to prevent welding defects and improve assemblability of the battery module 100 in the assembly between the frame member 300 and the end plate 150 and between the frame member 300 and the upper plate 400, a first fixing part 500 is formed at the edge of the frame member 300 coupled with the end plate 150 and a protrusion-shape second fixing part 700 is formed at the edge of the frame member 300 coupled with the upper plate 400, as shown in FIG. 3. Thereby, it is possible to obtain the effects of preventing the occurrence of welding defect problems caused by structural coupling through welding and improving the assemblability of the battery module 100. In addition, the first fixing part 500 includes a screw coupling part 520 formed on the side surface part 300b, and a first protrusion part 610 and a second protrusion part 620 are further formed on the side surface part 300b, thereby capable of minimizing deformation of the frame member 300 of the present disclosure when cell swelling occurs, and thus achieving the effect of securing structural stability.

Next, the first fixing part formed in the battery module according to an embodiment of the present disclosure will be described in detail.

FIG. 4 is an enlarged view of a section A of FIG. 3, which is a diagram showing a state in which the first fixing part of the battery module according to an embodiment of the present disclosure is fastened. FIG. 5 is a diagram showing a state in which the first fixing part of FIG. 4 is not fastened.

Referring to FIGS. 4 and 5, the first fixing part 500 includes a screw coupling part 520 and a hole part 540 formed in the end plate 150, and may include a screw member 560 fitted in the hole part 540. At this time, the screw coupling part 520 is formed at the edge of the frame member 300, particularly the side surface part 300b of the frame member 300, and the screw member 560 may be fitted in the hole part 540 and then fixed by the screw coupling part 520. In addition, it is also possible to form a plurality of the first fixing part 500 within a range that can improve assemblability between the end plate 150 and the frame member 300.

Further, the first fixing part 500 including the screw coupling part 520, the hole part 540 and the screw member 560 of the present disclosure may be a tapping fixing part. Therefore, the screw member 560 of the present disclosure is not particularly limited, and specifically, it may be a screw, and more specifically, a tapping screw.

In this case, the screw coupling part 520 may be formed on the side surface part 300b so as to be parallel to the edge of the side surface part 300b where the side surface part 300b and the bottom part 300a are in contact with each other. In particular, the screw coupling part 520 may have an arc shape, and specifically, may have a fan-shaped arc shape, and may have a circular arc shape in addition to the above shape. Specifically, the shape may be a cross-sectional shape of the screw coupling part 520, and by having the above shape, the screw member 560 can be fixed by the screw coupling part 520.

The screw coupling part 520 may be formed integrally with the frame member 300, particularly the side surface part 300b. By being formed integrally with the side surface part 300b during the process, the cross-sectional modulus of the screw coupling part 520 structure is increased, and the effect of suppressing, preventing and minimizing the deformation of the side surface part 300b that occurs during cell swelling can be achieved.

In addition, in order to achieve the above effects, a first protrusion part 610 and a second protrusion part 620 can be formed on the side surface part 300b of the battery module 100 of the present disclosure, in addition to the screw coupling part 520. The first protrusion part 610 may be formed so as to protrude more outward from the side surface part 300b than the second protrusion part 620, and the first protrusion part 610 may be formed so as to be adjacent to the central part of the side surface part 300b in which the cell swelling occurs most frequently. Further, the first protrusion part 610 and the second protrusion part 620 may be formed in plural numbers, and the second protrusion part 620 can be formed so as to be adjacent to the upper edge and the lower edge of the side surface part 300b, so that the first projection part 610 is formed between the second projecting parts 620 formed in plural numbers. However, the positions of the first protrusion part 610 and the second protrusion part 620 are not limited thereto, and the first protrusion part 610 can be formed so as to be adjacent to the upper edge and lower edge of the side surface part 300b, and the second protrusion part 620 can be formed so as to be adjacent to the central part of the side surface part 300b.

The shape of the first protrusion part 610 and the second protrusion part 620 is not particularly limited, but may be formed as a protrusion part having an angled edge or a protrusion part having a curved surface. In addition, an additional structure can be included on the first protrusion part 610 and the second protrusion part 620 to increase module rigidity, but is not limited thereto.

Next, the second fixing part included in the battery module of the present disclosure will be described in detail.

FIG. 6 is an enlarged view of a section B of FIG. 3, which is a diagram showing the second fixing part of the battery module according to an embodiment of the present disclosure. FIG. 7 is a diagram showing a cross-section of the second fixing part of FIG. 6.

Referring to FIGS. 6 to 7, the battery module according to an embodiment of the present disclosure may be configured such that a protrusion-shaped second fixing part 700 is formed at the edge of the frame member 300 coupled with the upper plate 400, particularly the side surface part 300b. The second fixing part 700 can improve assemblability of the battery module of the present disclosure by coupling the upper plate 400 and the frame member 300 instead of the conventional welding assembly.

Further, the second fixing part 700 may include a third protrusion part 710 formed at the edge of the frame member 300 and a curved surface part 720 extending from the edge of the upper plate 400. In this case, the curved surface part 720 can be fastened and fixed to the third protrusion part 710.

At this time, the curved surface part 720 may be formed in a circular arc shape or a semicircular arc shape. Specifically, the curved surface part 720 may have a cross section of a circular arc shape or a semicircular arc shape, and by having the above shape, it can be fastened to the third protrusion part 710. The third protrusion part 710 coupled with the curved surface part 720 may also have a protruding shape formed so as to have a curved surface, but is not particularly limited thereto, and can be deformed within the range where the fastening with the curved surface part 720 is effectively achieved.

Further, in the above fastening, as the curved surface part 720 is formed in an arc shape, the curved surface part 720 is located so as to be adjacent to the third protrusion part 710 and then pressed, so that the curved surface part 720 and the third protrusion part 710 can be fastened by elasticity. A strong fixing force between the curved surface part 720 and the third protrusion part 710 is formed due to fastening by elasticity, thereby capable of improving assemblability of the battery module of the present disclosure.

The curved surface part 720 can be formed on the whole of one edge of the upper plate 400, and the third protrusion part 710 may be formed on the whole of one edge of the frame member 300. In addition, the curved surface part 720 may be formed integrally with the upper plate 400, and the third protrusion part 710 may be formed integrally with the frame member 300. Thereby, the curved surface part 720 and the third protrusion part 710 are fastened, so that the upper plate 400 and the frame member 300 can be assembled.

As described above, the battery module according to an embodiment of the present disclosure includes a fixing part, thereby capable of providing a battery module having improved assemblability. Particularly, deformation of the frame member during cell swelling can be suppressed and prevented through the screw coupling part included in the fixing part, thereby enabling provision of a battery module having improved structural stability. In addition, by providing a battery module including a side surface part formed with the first and second protrusion parts, it is possible to achieve the effect of securing additional structural stability.

The above-mentioned battery module may be included in the battery pack. The battery pack may have a structure in which one or more of the battery modules according to the present embodiment are gathered, and packed together with a battery management system (BMS) and a cooling device that control and manage battery's temperature, voltage, etc.

The battery pack can be applied to various devices. Such a device can be applied to a vehicle means such as an electric bicycle, an electric vehicle, or a hybrid vehicle, but the present disclosure is not limited thereto, and is applicable to various devices that can use a battery module, which is also falls under the scope of the present disclosure.

Although preferred embodiments of the present disclosure have been described in detail above, the scope of the present disclosure is not limited thereto, and numerous other modifications and embodiments can be devised by those skilled in the art, without departing from the spirit and scope of the principles of the invention described in the appended claims. Further, these modifications should not be understood individually from the technical spirit or perspective of the present disclosure.

DESCRIPTION OF REFERENCE NUMERALS

110: battery cell
120: cell assembly (battery cell stack)
130: busbar frame
150: end plate
200: module frame
300: frame member
300a: bottom part
300b: side surface part
400: upper plate
500: first fixing part
520: screw coupling part
540: hole part
560: screw member
610: first protrusion part
620: second protrusion part
700: second fixing part
710: third protrusion part
720: curved surface part

The invention claimed is:

1. A battery module comprising:
a cell assembly including a battery cell stack, wherein the battery cell stack includes a plurality of stacked battery cells;
a module frame configured to at least partially wrap around the cell assembly; and
a plurality of end plates configured to cover a front surface and a rear surface of the cell assembly in the module frame,
wherein the module frame includes a frame member that covers a lower part and both side surfaces of the cell assembly, and wherein the module frame includes an upper plate that covers an upper part of the cell assembly,
wherein a first fixing part is positioned along an exterior surface of the frame member, the first fixing part coupling the frame member with the end plate, wherein the first fixing part includes a screw coupling part,
wherein the frame member comprises:
a side surface part configured to cover the side surface of the cell assembly; and
a bottom part configured to support the lower part of the cell assembly;
wherein the screw coupling part is disposed on the side surface part of the frame member, so as to protrude therefrom,
wherein the screw coupling part is parallel to an edge of the side surface part and extends along a longitudinal direction of the side surface part, and
wherein the side surface part and the bottom part are in contact with each other.

2. The battery module of claim 1, wherein the first fixing part comprises:
a hole part positioned in the end plate; and
a screw member configured to fit in the hole part.

3. The battery module of claim 2, wherein:

the screw coupling part is configured to fix the screw member.

4. The battery module of claim 1, wherein:

the screw coupling part has a fan-shaped arc shape.

5. The battery module of claim 4, wherein:

the screw coupling part is formed integrally with the side surface part.

6. The battery module of claim 1, wherein:

the side surface part includes a first protrusion part and a second protrusion part.

7. The battery module of claim 6, wherein:

the second protrusion part is configured as a plurality of second protrusion parts, and the first protrusion part is positioned between the plurality of the second protrusion parts.

8. The battery module of claim 7, wherein:

the first protrusion part is formed so as to protrude more outward from the side surface part than the second protrusion part.

9. The battery module of claim 1, wherein:

a second fixing part is positioned along an edge of the frame member, the second fixing part coupling the frame member with the upper plate.

10. The battery module of claim 9, wherein the second fixing part comprises:

a third protrusion part positioned along the edge of the frame member; and a curved surface part extending from an edge of the upper plate.

11. The battery module of claim 10, wherein:

the curved surface part is configured to be fixed to the third protrusion part.

12. The battery module of claim 11, wherein:

the curved surface part is formed in a semicircular arc shape.

13. The battery module of claim 10, wherein:

the curved surface part is formed in a circular arc shape.

14. The battery module of claim 10, wherein:

the curved surface part is positioned along an entirety of a longitudinal extent of the edge of the upper plate, and the third protrusion part is positioned on an entirety of a longitudinal extent of the edge of the frame member.

15. The battery module of claim 10, wherein:

the curved surface part is formed integrally with the upper plate.

16. A battery pack comprising the battery module of claim 1.

* * * * *